3,291,622
Patented Dec. 13, 1966

3,291,622
REFRACTORY ARTICLES
Victor Mandorf, Jr., Fostoria, Ohio, and Ronald W. Reidl, Pittsburgh, Pa., assignors to Union Carbide Corporation, a corporation of New York
No Drawing. Filed June 2, 1965, Ser. No. 460,868
4 Claims. (Cl. 106—55)

The present application is a continuation-in-part of Serial No. 194,990, filed May 15, 1962, now abandoned.

This invention relates to articles of manufacture having improved properties at elevated temperatures. More particularly, the present invention relates to shaped articles which are made from boron nitride or mixtures of boron nitride and titanium boride and which have substantially improved high temperature properties.

The use of boron nitride and mixtures of boron nitride with refractory borides in the manufacture of shaped articles is known. However, while such shaped articles are characterized by various properties which are advantageous for high temperature applications, there is a need to provide further improvement in such articles particularly as regards high temperature strength, resistance to permanent deformation in high temperature operation, and resistance to thermal cracking at high temperatures.

It is an object of this invention to provide a shaped refractory article having superior high temperature strength.

It is a further object of this invention to provide a shaped refractory article having superior resistance to permanent deformation at high temperatures.

It is a still further object of the present invention to provide a shaped refractory article having superior resistance to thermal cracking in extended use at high temperatures.

Other objects will be apparent from the following description and claims.

An article of manufacture in accordance with the present invention is a shaped article formed by hot pressing a mixture consisting essentially of boron nitride material, calcium fluoride in an amount between 2 and 10 percent by weight of the boron nitride material, and up to 80 percent by weight titanium boride.

It has been discovered as part of the present invention that by including calcium fluoride in mixture with boron nitride material, and then hot pressing the mixture to provide a shaped article, the article which is thus provided is characterized by superior strength at elevated temperatures and superior resistance to moisture pick-up. Further, for particular proportions of calcium fluoride in the mixture, the high temperature strength is further increased to a very substantial extent and at the same time resistance to permanent deformation at high temperatures is greatly enhanced.

Moreover, when mixtures of boron nitride material with titanium boride are mixed with calcium fluoride and subsequently hot pressed to provide shaped articles, it has been found that these articles, in addition to having high temperature strength and resistance to moisture pick-up, are characterized by superior resistance to thermal cracking at high temperatures. In addition, these articles have been found to be substantially uniformly wettable by molten aluminum which is not the case for crucibles prepared without calcium fluoride additions. This latter property is of considerable industrial benefit since boron nitride-titanium boride articles are widely used in aluminum vaporization processes where the complete wetting of crucibles with molten aluminum is highly desirable.

The boron nitride material used in the practice of the present invention can be any commercially available material so long as it has not been previously treated at temperatures above about 1400° C. Boron nitride material which has been subjected to higher temperatures for extended periods is generally not suitable for hot pressing.

Such boron nitride material as is contemplated by this invention usually contains between about 2 and 13 percent of impurities which are believed to be mostly oxygen in chemically or physically combined form. It is considered generally that these impurities exert a strong adverse effect upon the high temperature properties of articles formed from boron nitride. When calcium fluoride is added to boron nitride material and reacted in the course of hot pressing, a portion of the impurities in the boron nitride material is converted to a more stable compound and another portion of the impurities is removed as a volatile by-product.

Measurement and analysis of by-product gas evolved during the hot pressing and reaction of the boron nitride material and calcium fluoride show that a substantial amount of boron and fluorine-containing gas is liberated. This removal of boron by virtue of the aforementioned reaction results in a substantial reduction in the impurity content of the hot pressed material and contributes to the improvement in the high temperature properties of the resulting article.

In a particular embodiment, the present invention is practiced by mixing finely divided boron nitride material with finely divided $CaF_2$, the particle sizes of the mixture being preferably through 200 mesh. The mixture is blended and placed in a mold and subsequently heated to a temperature between about 1600° C. and 2100° C. Pressure, suitably in the range of 500–2000 p.s.i., is continuously applied to the mixture during heating until maximum desification is obtained. During the hot pressing of the mixture, calcium fluoride reacts with the boron nitride material. This reaction is evidenced by a weight loss in the hot pressed material due to the escape of volatile reaction products.

When the hot-pressing operation has been completed the resulting shaped article is removed from the mold and, when cooled, is in condition for immediate use.

It has been found in the practice of the present invention that when the calcium fluoride in the mixture amounts to between about 2 and 10 percent by weight of the boron nitride material, the shaped article obtained by hot pressing has superior strength at elevated temperatures. This feature of the present invention is illustrated in Table I. All of the hot pressed articles referred to in the following tables were hot pressed at 2000 p.s.i. and 1800° C.

TABLE I

| Mixture Composition | Percent Oxygen in BN after Hot Pressing | Fleuxural Strength [1] of Hot pressed Mixture, p.s.i. | | | |
|---|---|---|---|---|---|
| | | 100° C. | 500° C. | 1,100° C. | 1,800° C. |
| BN | 2.0 | 7,940 | 1,840 | 1,100 | 2,690 |
| BN+2% $CaF_2$ | 1.6 | 10,700 | 14,900 | 4,720 | 6,800 |
| BN+4% $CaF_2$ | 1.3 | 8,890 | 11,700 | 4,340 | 10,500 |
| BN+10% $CaF_2$ | 1.4 | 7,050 | 6,110 | 2,830 | 6,130 |

[1] Measured with force applied perpendicular to direction of initial pressing.

It has also been found that when the amount of calcium fluoride in the mixture is limited to between 2 and 4 percent by weight of the amount of boron nitride material, the resulting hot pressed article, in addition to having superior strength at elevated temperatures, is also characterized by resistance to deformation at elevated temperatures as shown in Table II.

TABLE II

| Mixture Composition | Percent Oxygen in BN after Hot Pressing | Permanent Deformation in Hot Pressed Article [1] after heating to 2,000° C. | Percent Weight Loss |
|---|---|---|---|
| BN | 2.0 | $3.3 \times 10^{-3}$ in./in. | |
| BN+2% CaF$_2$ | 1.6 | $1.4 \times 10^{-3}$ in./in. | 1.2 |
| BN+4% CaF$_2$ | 1.3 | $1.6 \times 10^{-3}$ in./in. | 2.1 |
| BN+10% CaF$_2$ | 1.4 | $3.0 \times 10^{-3}$ in./in. | 3.2 |

[1] Parallel to direction of pressing.

In a further embodiment of this invention, finely divided titanium boride is mixed and hot pressed with boron nitride material and calcium fluoride. The resulting shaped article is characterized by superior strength and superior resistance to thermal cracking at elevated temperatures.

The superior strength of articles hot pressed from a mixture of boron nitride, titanium boride and calcium fluoride in accordance with the present invention are shown in Table III. The articles whose properties are described in Table III were all formed in the same hot-pressing apparatus under identical conditions of temperature and pressure.

TABLE III

| Mixture Composition | Percent Oxygen in Mixture after Hot Pressing | Flexural Strength of Hot Pressed Mixture—p.s.i. | | | | | | |
|---|---|---|---|---|---|---|---|---|
| | | 500° C. | 1,100° C. | 1,800° C. | 500° C. | 800° C. | 1,100° C. | 1,800° C. |
| | | ([1]) | ([1]) | ([1]) | ([2]) | ([2]) | ([2]) | ([2]) |
| 1:1 BN/TiB$_2$ | 1.7 | 5,300 | 3,150 | 1,950 | 7,350 | 4,530 | 3,490 | 3,680 |
| 1:1 BN/TiB$_2$+1% CaF$_2$ | 1.6 | 15,300 | 2,830 | 2,240 | 17,000 | 4,300 | 3,050 | 3,790 |
| 1:1 BN/TiB$_2$+2%CaF$_2$ | 1.4 | 15,200 | 3,060 | 4,140 | 12,200 | 4,780 | 3,550 | 4,320 |
| 1:1 BN/TiB$_2$+3%CaF$_2$ | 1.2 | 13,300 | 2,800 | 4,050 | 12,700 | 3,480 | 2,760 | 3,900 |

[1] Measured with force applied perpendicular to direction of initial pressing.
[2] Measured with force applied parallel to direction of initial pressing.

To determine the high temperature stability and permanent deformation characteristics of hot pressed mixtures of boron nitride, with titanium boride and calcium fluoride, several cylindrically shaped samples were prepared by identical hot pressing methods and subjected to high temperature conditions. For purposes of comparison, samples prepared from a mixture containing no calcium fluoride were also tested.

The thermal stability test was accomplished by heating the samples under test, which were first machined to the shape of a crucible, in a vacuum of one micron or less and vaporizing aluminum therefrom at a rate of 2 to 11 gms./minute. During aluminum vaporization the temperature of the crucible varied from about 1400–1800° C. This test approximates the conditions found in the usual commercial process for the vaporization of aluminum.

The results of the permanent deformation test are shown in Table IV and the results of the thermal stability test are shown in Table V.

TABLE IV

| Mixture Composition | Permanent Deformation in Hot Pressed Sample After Heating to 1,800° C. | |
|---|---|---|
| | In Parallel to Pressing Direction | In Perpendicular to Pressing Direction |
| 50% BN, 50% TiB$_2$ | $12.0 \times 10^{-3}$ in./in. | $8.3 \times 10^{-3}$ in./in. |
| 49% BN, 50% TiB$_2$, 1% CaF$_2$ | $6.0 \times 10^{-3}$ in./in. | $2.8 \times 10^{-3}$ in./in. |
| 48% BN, 50% TiB$_2$, 2% CaF$_2$ | $5.3 \times 10^{-3}$ in./in. | $1.2 \times 10^{-3}$ in./in. |
| 47% BN, 50% TiB$_2$, 3% CaF$_2$ | $4.5 \times 10^{-3}$ in./in. | $0.9 \times 10^{-3}$ in./in. |

TABLE V

| Mixture Composition | Percent Oxygen in Mixture after Hot Pressing | Thermal Stability of Hot Pressed Crucibles |
|---|---|---|
| 50% BN, 50% TiB$_2$ | 1.7 | Cracked after ½ to 3 hours. |
| 49% BN, 50% TiB$_2$, 1% CaF$_2$ | 1.6 | Uniform erosion, no cracking after 20 hours operation. |
| 48% BN, 50% TiB$_2$, 2% CaF$_2$ | 1.4 | Do. |
| 47% BN, 50% TiB$_2$, 3% CaF$_2$ | 1.2 | Do. |

It can be seen from Tables IV and V that the permanent deformation and resistance to cracking of materials of the present invention are unexpectedly superior to those formed without calcium fluoride. It has been established that a low permanent deformation coincides with good high temperature thermal stability and long service life of crucibles under conditions of aluminum vaporization.

A further advantage of the present invention is that boron nitride-titanium boride articles such as crucibles, when formed from a mix containing calcium fluoride, provide more stable operation when heated electrically. This is due at least in part to the fact that the variation of electrical resistivity with increasing temperature is substantially less for boron nitride-titanium boride articles of this invention than for similar articles formed without the inclusion of calcium fluoride. For example, a crucible formed by hot pressing a 1:1 mixture of boron nitride and titanium boride with about 2 percent calcium fluoride showed an increase in resistivity of only 13 percent between room temperature and 1000° C. On the other hand, a crucible formed in the same manner from a 1:1 boron nitride-titanium boride mixture containing no calcium fluoride exhibited a 26 percent increase in resistivity over the same temperature range.

Another advantage of the boron nitride-titanium boride article of this invention is that it is uniformly wettable by molten aluminum. This is of substantial benefit in the vaporization of aluminum by the process of heating aluminum in a crucible under high vacuum conditions. Due to the uniform wettability of a crucible formed in accordance with the present invention, the operating conditions of the crucible can be stabilized quickly. This reduces the thermal cycling to which the crucible is subjected and consequently increases its service life.

The aforedescribed benefits of the present invention, viz. high temperature strength, structural and electrical stability and wettability by aluminum are obtained when the amount of calcium fluoride in the boron nitride-titanium boride mixture is between about 2 and 7 percent by weight of the boron nitride, and when the titanium boride constitutes between about 20 and 80 percent by weight of the mixture.

The mesh sizes referred to herein are U.S. Screen series.

From the foregoing description it can be seen that the present invention constitutes a substantial benefit to the art by providing refractory articles having superior high temperature properties.

What is claimed is:

1. A hot pressed article formed from a mixture consisting essentially of boron nitride, calcium fluoride in an amount between 2 and 10 percent by weight of the boron nitride, and up to 80 percent by weight titanium boride.

2. A hot pressed article formed from a mixture consisting essentially of boron nitride and between 2 and 4 percent by weight calcium fluoride.

3. A hot pressed article formed from a mixture consisting essentially of boron nitride, calcium fluoride in an amount between 2 and 7 percent by weight of the boron nitride and between 20 and 80 percent by weight titanium boride.

4. A hot pressed article formed from a mixture consisting essentially of substantially equal amounts by weight of boron nitride and titanium boride, and calcium fluoride in an amount between 2 and 7 percent by weight of the boron nitride.

References Cited by the Examiner
UNITED STATES PATENTS

| | | | |
|---|---|---|---|
| 2,855,316 | 10/1958 | Taylor | 106—39 |
| 3,003,885 | 10/1961 | Mandorf | 106—39 |

TOBIAS E. LEVOW, *Primary Examiner.*

J. POER, *Assistant Examiner.*